Nov. 17, 1959 — E. B. McCURLEY — 2,913,012
STOPPER PLUG VALVE
Filed Dec. 3, 1957 — 2 Sheets-Sheet 1
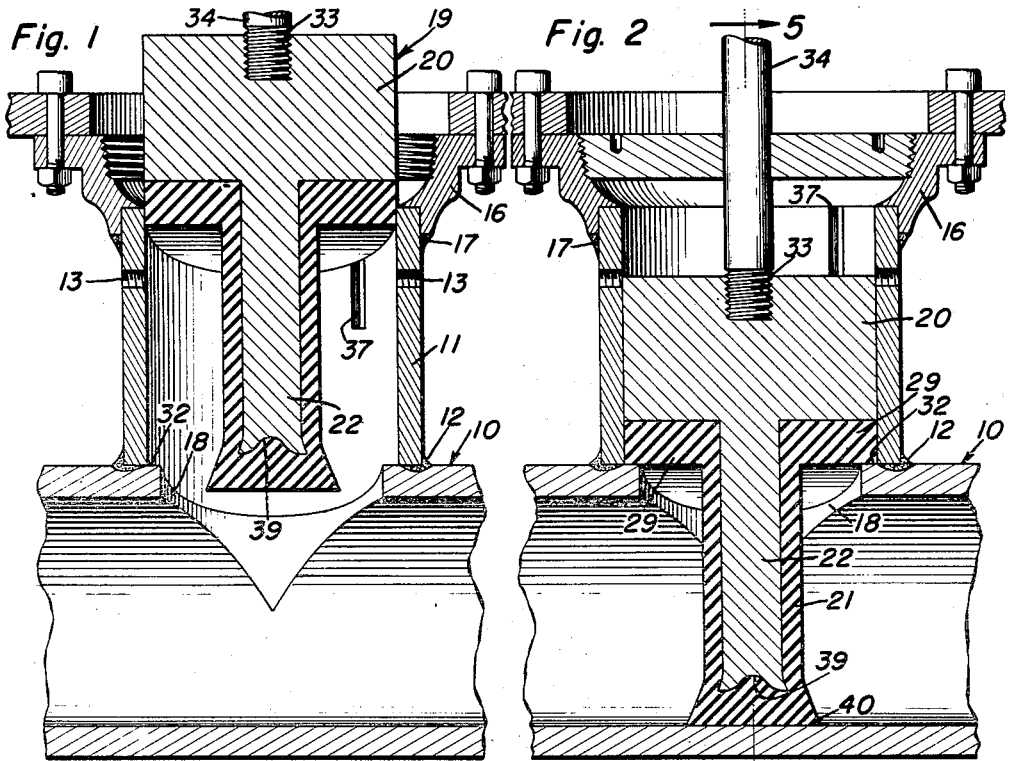
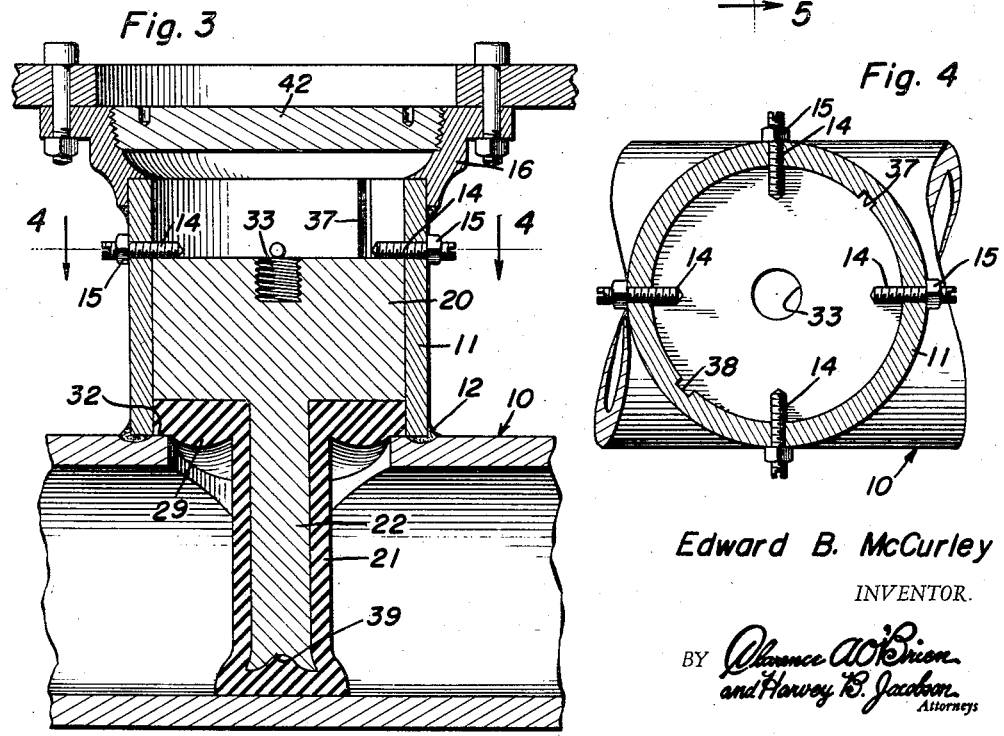
Edward B. McCurley
INVENTOR.

Nov. 17, 1959   E. B. McCURLEY   2,913,012
STOPPER PLUG VALVE
Filed Dec. 3, 1957   2 Sheets-Sheet 2

Edward B. McCurley
INVENTOR.

BY *Clarence A. O'Brien*
*and Harvey B. Jacobson*
Attorneys

United States Patent Office 2,913,012
Patented Nov. 17, 1959

2,913,012

STOPPER PLUG VALVE

Edward B. McCurley, West Monroe, La., assignor of one-fourth to Walter B. Mann, Monroe, La., and one-fourth to Charles T. Bashman, Irving, Tex.

Application December 3, 1957, Serial No. 700,372

6 Claims. (Cl. 138—94)

This invention relates to stopper plug valves in general, as disclosed in my copending application Serial No. 700,371, filed December 3, 1957, and pertains, more particularly, to stopper plug valves of this type particularly adapted for high pressure use.

It is frequently necessary, in oil and gas lines in particular, to provide means for at least temporarily stopping the flow of fluid in order to permit repairs, further installations and the like to be effected. The pressures encountered under each circumstance may at times exceed several thousand pounds per square inch and for this reason, it is necessary to provide means to effectively block the line without danger of leakage. It is therefore a primary object of this invention to provide an improved form of stopper plug valve particularly adapted to effectively block the flow of fluids in high pressure oil, gas or similar lines.

Another object of this invention is to provide an improved form of stopper plug valve employing a hard core element carrying a resilient sheath and which sheath is engageable with surface portions of a pipe line to be backed up by the hard core to exert a high unit sealing pressure to block the flow of fluids in the line.

Another object of this invention is to provide a valve of the character described including a cylinder adapted to be rigidly affixed to an associated pipe line and having a piston member snugly but slidably fitted therein, the piston being provided with a spade-like tongue with the tongue and lower end of the piston being covered with resilient material to sealingly engage with surface portions of the associated pipe line to seal off the flow of fluid therethrough.

Still another object of this invention resides in the provision of improvements in stopper plug valves wherein the construction embodies means whereby the flow of fluid under extremely high pressure may be effectively blocked while still permitting operation of the valve to desired intermediate positions so as to effect only the throttling of fluid flow through the line.

A further object of this invention is to provide improvements in stopper plug valves wherein the valve body comprises a cylindrical portion snugly fitted within a cylinder fixed to a pipe line having an opening therein of less diameter than the diameter of the body, and the body having a depending, flat tongue thereon covered with resilient material and extending in covering relation to the lower end of the body, the resilient material being effective to sealingly engage the lip around the pipe opening and across the inner surface of the pipe as downward pressure is exerted on the body, whereby to block the pipe line.

Another object of this invention lies in the provision of an improved form of stopper plug valve of the character above set forth wherein the tongue of the valve body is provided with a substantially peripherally extending groove to interlockingly retain the resilient material thereon.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a longitudinal vertical section taken through a pipe line having a plug valve constructed in accordance with this invention associated therewith and showing the valve in withdrawn position;

Figure 2 is a view similar to Figure 1 but showing the valve bottomed within the pipe;

Figure 3 is a view similar to Figure 2 but showing the valve held in sealed position and with a completion plug associated with the assembly;

Figure 4 is a horizontal section taken along the section line 4—4 of Figure 3 and further illustrating the manner of temporarily or permanently holding the plug valve in sealed position;

Figure 5:
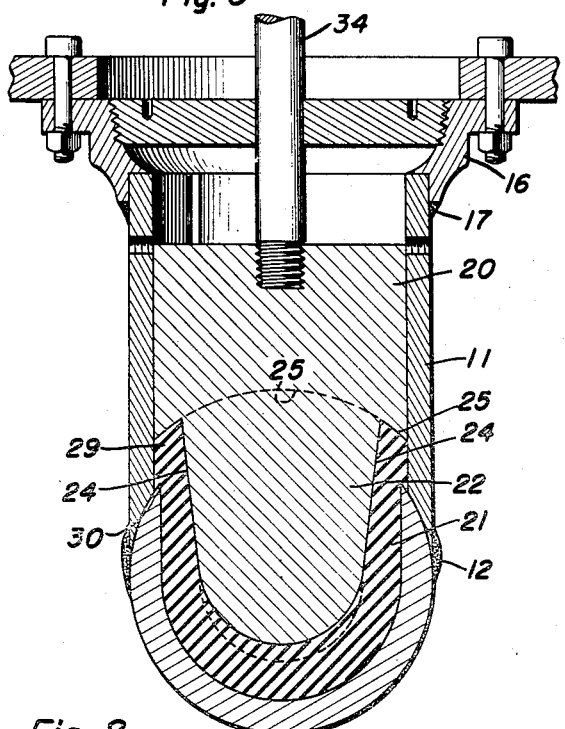
Figure 5 is a transverse sectional view taken along the plane of section line 5—5 in Figure 2 and illustrating the manner in which the valve effectively seals off the pipe line.

Referring at this time more particularly to Figure 1, the reference character 10 indicates in general a pipe line in which it is desired to introduce a stopper plug valve constructed in accordance with this invention. For this purpose, it is first necessary to fix the cylinder or sleeve 11 to the pipe and this is accomplished in this particular example, by means of the weld 12 to insure a sufficiently rigid connection as to withstand the high pressures encountered in the line.

The sleeve 11 may be provided with a series of horizontally aligned, tapped openings 13, each being filled by an associated set screw 14 held in place by a lock nut 15. These openings, if provided, are disposed at a predetermined distance above the lower end of the sleeve, for a purpose presently set forth.

A flanged coupling element 16 is provided at the upper end of sleeve 11 and is preferably welded thereto as at 17. The sleeve 11 together with the coupling element 16 form the base rigidly attached to the pipe 10 and by means of which certain conventional mechanisms are attached, as set forth in my above mentioned copending application. That is to say, operating in conjunction with this base is a foot valve assembly which would be mounted directly to the flanged element 16 and on top of this valve would be mounted a conventional tapping machine by means of which the side opening 18 is cut in the valve of pipe 10, such opening being of a diameter equal to the inside diameter of the pipe as is well known in this art. All operations take place through the foot valve so as to permit such operations to take place without shutting down the flow of fluid through the line, all as is well known and conventional in this art.

After the hole 18 is cut, the tapping machine is utilized to insert the valve body indicated generally by the reference character 19 into the confines of sleeve 11.

Figure 6:
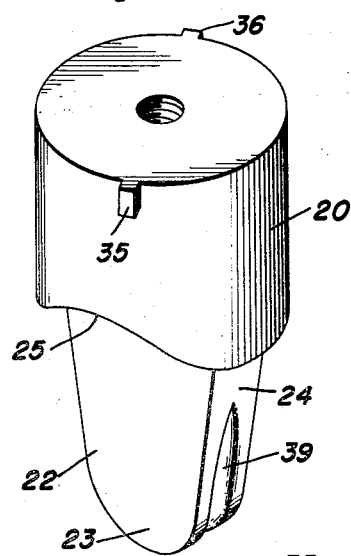
Figure 6 is a perspective view of the valve piston.
Figure 7:
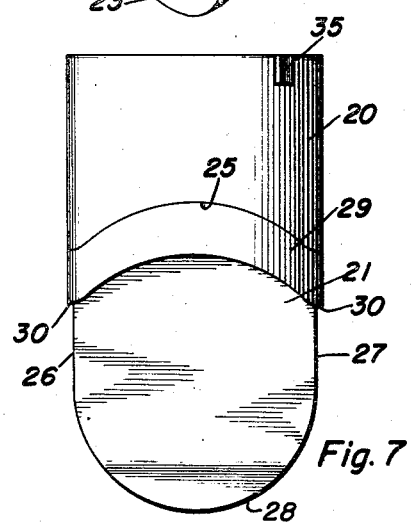
Figure 7 is a side elevation of the piston having the sealing jacket bonded thereto.

As is shown most clearly in Figures 6 and 7, the valve body consists essentially of a piston member 20 having the lower end thereof covered with resilient material 21. The lower end of the piston includes the depending tongue 22 having flat opposite side faces and a marginal edge presenting, in profile, a rounded nose portion 23 and tapering, downwardly convergent edge portions 24. The dimensions of the tongue 22 are such that it is relatively thin and is of a width less than the diameter of the cylindrical upper portion of the piston such that the lower end of such upper portion is provided with an overhanging skirt which is contoured in general conformity to the opposed surfaces of pipe 10 surrounding the opening 18 therein, as indicated at 25.

The lower face presented by the piston skirt and the tongue 22 are covered by the resilient material 21 which is preferably of rubber bonded to the piston. It is to be noted that the opposite sides 26 and 27 of the resilient material are vertical and parallel to each other and meet tangentially with the smoothly arcuate lower edge 23 which is of the same radius as the inside surface of pipe 10. Moreover, the width between the opposite side edges 26 and 27 is less than the diameter of the skirt portion 29 which, in turn, is of the same diameter as the piston 20, so that even at the widest point of the tongue, the skirt 29 is undercut as at 30.

The sleeve 11 is provided with a smooth bore 31 which snugly but slidably receives the piston 20 and it is to be noted that this bore is of slightly larger diameter than the opening 18 to present the annular surface portion 32 surrounding such opening. The marginal lower edge of skirt 29, including the undercut portion 30 are adapted to seat upon and seal against the surface portion 32, as may be best seen in Figures 2 and 3. At the same time, the peripheral edge of the material on the piston tongue will be in engagement with corresponding interior surface portions of the pipe 11, see particularly Figure 5. The upper end of the piston is provided with a tapped opening 33 receiving the threaded lower end of rod 34 by means of which the assembly is fed past the associated foot valve and into the pipe. Rod 34 forms part of the tapping machine but may later be replaced by a suitable actuating rod having a handle attached thereto and by means of which the valve may be disposed in an intermediate or fully open position, as desired, so that the same acts as a gate valve for the pipe line.

Referring again to Figure 5, it will be seen that the piston is provided with a pair of radially projecting ears 35 and 36 and, as shown most clearly in Figure 4, the sleeve is provided with a pair of slots 37 and 38 within which these ears are received to guide the piston and to insure that the same is properly oriented with respect to the pipe line so that the tongue is disposed transversely thereof. Preferably, the marginal edge of the tongue 22 is provided with a substantially peripherally extending groove 39 so that the resilient material is interlocked therewith to withstand the high pressure within the pipe line without undue deformation. Also, it is preferred that the marginal edge of the resilient material in the region of the tongue be widened, as at 40, see Figure 2, to prevent buckling under of this material under high pressures.

In order to lock the valve in place, permitting removal of the foot valve and tapping machine, the set screws 14 are utilized. Their disposition within the sleeve 11 is such as to underlie and hold the piston in place after the same has been urged downwardly to effect compression of the resilient material to seal with the interior of the pipe and with the surface 32 as is shown in Figure 3. This position of parts will permit the removal of the foot valve and tapping machine and if the line is to be permanently plugged, a completion plug 42 may be threaded into coupling element 16 as shown. Alternatively, should it be desired to utilize the valve as a gate valve in the line, a head carrying an actuating rod having a handle and engaged in recess 33 may be utilized, in which case the completion plug would not be used and which would permit the set screws 14 to be dispensed with.

Since the resilient material is compressed as the piston is forced downwardly as shown in Figure 3, and since the opposite side edges 24 of the tongue are tapered as shown, a wedging action will take place to more effectively seal the resilient material against the pipe in a direction at right angles to the movement of the piston.

Figure 8:
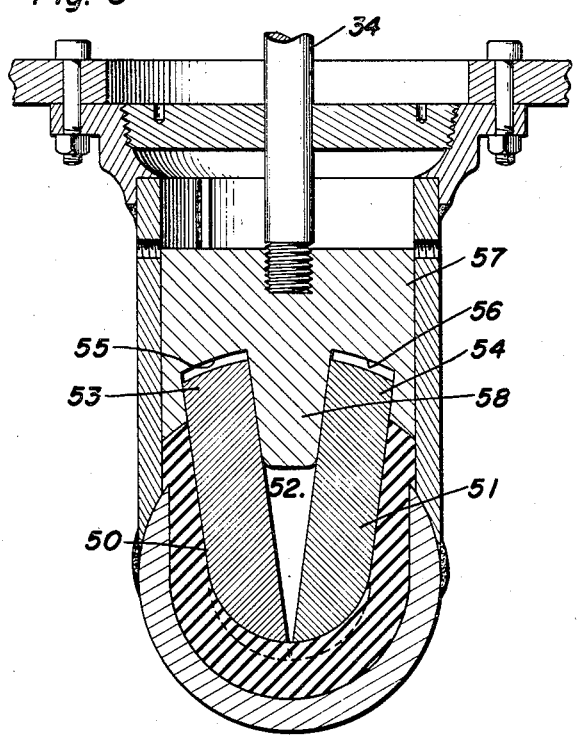
Figure 8 is a view similar to Figure 5 but showing a modified form of the invention.

To effect a more powerful wedging action of this type, an assembly such as is illustrated in Figure 8 may be used. In this modification, the tongue of the piston is provided by a pair of blocks 50 and 51 which define a downwardly convergent V-notch 52 therebetween. The upper end portion 53 and 54 of these blocks are received in recesses 55 and 56 in the lower end of the piston body 57 and normally positioned to provide the space therein as shown. The piston body includes a wedge 58 between the blocks and when downward pressure is exerted on the piston body, the wedge will spread the blocks until they are bottomed in the recesses 55 and 56 after which further downward movement will force the nose into tight contact with the pipe.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A stopper plug valve comprising a sleeve adapted for attachment to an associated pipe of constant internal cross-section and at right angles thereto, a piston snugly, slidably fitted within said sleeve and including a depending tongue having a substantially uniform thickness and being of a width less than the inside diameter of said sleeve to present a downwardly facing surface surrounding said tongue at the juncture thereof with the upper portion of said piston, a layer of resilient material enclosing said tongue and covering said downwardly facing surface, said resilient material being contoured to correspond to surface portions of an associated pipe for sealing engagement therewith as said piston is forced downwardly in said sleeve.

2. In combination with a pipe having a constant internal cross-section and a side wall opening therein of a diameter equal to the inside diameter of the pipe, a sleeve fixed to said pipe concentrically of said opening and having an inside diameter greater than the diameter of said opening to present a shoulder between the opening and said sleeve, a piston slidably received in said sleeve and including a cylindrical upper portion and a tongue depending therefrom, said tongue being of substantially uniform thickness and of a width slightly less than the diameter of said opening to provide a downwardly facing surface surrounding said tongue at the juncture thereof with said upper portion of the piston, a layer of resilient material enclosing said tongue and covering said downwardly facing surface to engage upon said shoulder and across the inner surface of said pipe when said piston is urged downwardly within said sleeve.

3. A stopper plug valve comprising a cylindrical sleeve adapted to be rigidly affixed to a pipe of a constant internal cross-section and at right angles thereto in register with a side wall opening therein, a piston assembly slidably fitted within said sleeve and including an upper portion of cylindrical configuration and a lower tongue portion, said tongue portion being of smaller dimensions than the diameter of said upper portion presenting an overhanging skirt on the lower end of said upper portion having a downwardly facing surface surrounding the tongue portion, a layer of resilient material enclosing said tongue portion and covering said downwardly facing surface for sealing engagement with an associated pipe.

4. The assembly as defined in and by claim 3 wherein said tongue portion includes a pair of blocks of rectangular cross-section having their upper ends received in recesses in the lower end of said upper portion and having opposed inner side edges disposed in downwardly convergent relation, said upper portion having a depending wedge between said recesses engaged with said side edges.

5. A stopper plug valve comprising a sleeve adapted for attachment to an associated pipe of a constant internal cross-section and at right angles thereto, a piston snugly, slidably fitted within said sleeve and including a depending tongue having a substantially uniform thickness and being of a width less than the inside diameter of said sleeve to present a downwardly facing surface surrounding said tongue at the juncture thereof with the upper portion of said piston, the opposite side edges of said tongue being disposed in downwardly convergent relation to effect a wedging action, a layer of resilient material enclosing said tongue and covering said downwardly facing surface, said resilient material being contoured to correspond to surface portions of an associated pipe for sealing engagement therewith as said piston is forced downwardly in said sleeve.

6. In combination with a pipe having a constant internal cross-section and a side wall opening therein of a diameter equal to the inside diameter of the pipe, a sleeve fixed to said pipe concentrically of said opening and having an inside diameter greater than the diameter of said opening to present a shoulder between the opening and said sleeve, a piston slidably received in said sleeve and including a cylindrical upper portion and a tongue depending therefrom, said tongue being of substantially uniform thickness and of a width slightly less than the diameter of said opening to provide a downwardly facing surface surrounding said tongue at the juncture thereof with said upper portion of the piston, a layer of resilient material enclosing said tongue and covering said downwardly facing surface to engage upon said shoulder and across the inner surface of said pipe when said piston is urged downwardly within said sleeve, the opposite side edges of said tongue being disposed in downwardly converging relation to effect a wedging action of said resilient material against the interior of said pipe.

References Cited in the file of this patent

UNITED STATES PATENTS

| | | |
|---|---|---|
| 1,119,948 | Green | Dec. 8, 1914 |
| 1,833,700 | Wolf | Nov. 24, 1931 |
| 2,285,779 | Mueller et al. | June 9, 1942 |
| 2,331,557 | Lorehn et al. | Oct. 12, 1943 |
| 2,482,696 | Smith et al. | Sept. 20, 1949 |